April 8, 1958
W. A. VOGT
2,829,960
METHOD AND METALLURGICAL DEVICE FOR THE REFINING OF STEEL
Filed Jan. 18, 1954
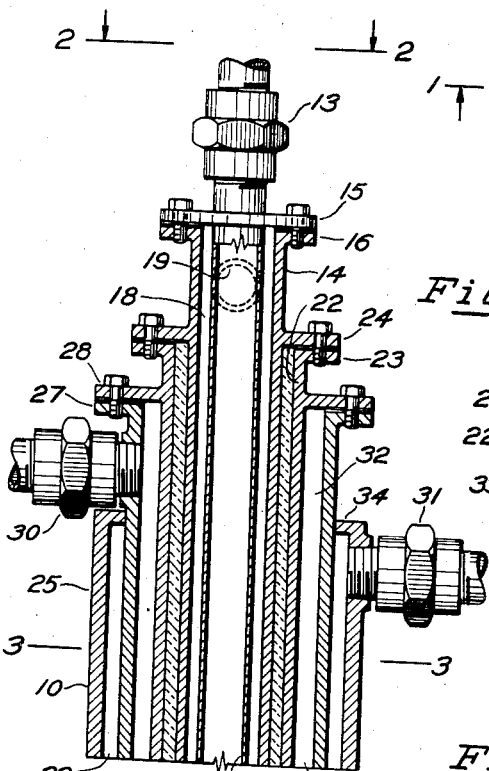
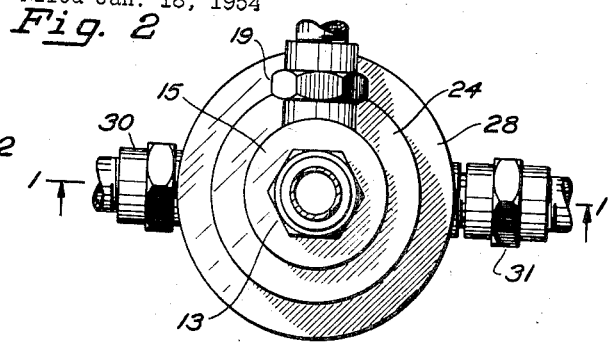
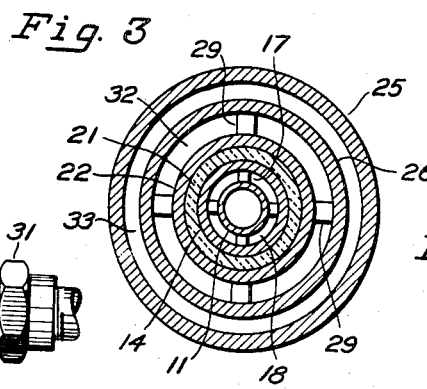
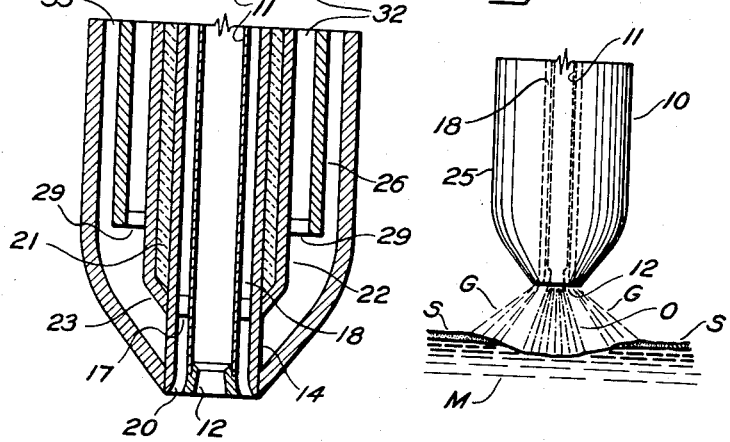
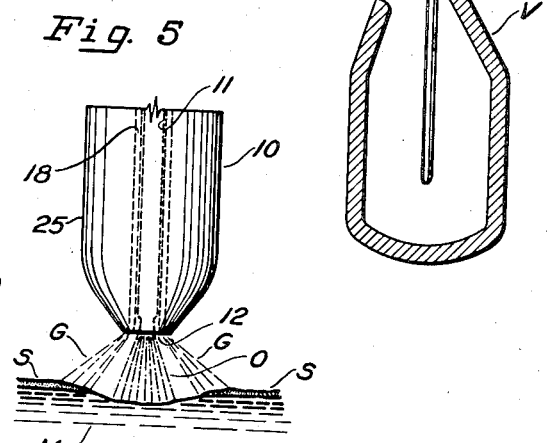
William A. Vogt
INVENTOR.
BY *James E. Toomey*
 *atty*

United States Patent Office 2,829,960
Patented Apr. 8, 1958

2,829,960

METHOD AND METALLURGICAL DEVICE FOR THE REFINING OF STEEL

William A. Vogt, Concord, Calif., assignor to Henry J. Kaiser Company, Oakland, Calif., a corporation of Nevada Application January 18, 1954, Serial No. 404,722

7 Claims. (Cl. 75—60)

This invention relates to a device for the introduction of oxidizing agents into a steel making vessel of the Bessemer type, whereby the charge of molten iron, contained in said vessel, is purged of its various impurities.

Since the introduction of the Bessemer process for the refining of iron in the steel making industry, it has long been recognized that the use of relatively pure oxygen in place of atmospheric air would not only result in a better product, but would also greatly curtail or even eliminate various undesirable conditions inherent in the process as heretofore practiced. The high production costs of oxygen, in quantity necessary for steel refining purposes, has, until recently, made its use economically impracticable; however, since the advent of the so-called tonnage oxygen plants, efforts have been directed toward the effective utilization of the product of these plants. Such efforts have met with limited success due in a large measure to the much greater heat concentration resulting from the use of oxygen alone, as compared with the reactions present in the use of atmospheric air with its relatively large nitrogen content. Attempts to introduce oxygen through the bottom or the sides of converters has failed because the conventional design of converter tuyere quickly becomes choked and thereby rendered unserviceable. Water-cooled copper tuyeres have been substituted for the conventional type, but the relatively short life of this type of tuyere, with consequent high cost, makes their use prohibitive, besides the great explosive dangers of water-cooled tuyeres.

The presently accepted method of bringing oxygen into contact with the molten contents of the vessel is by means of a relatively long pipe or "lance" which is inserted vertically through the charging opening of the vessel, and through which oxygen is forced at high velocity to impinge upon the surface of the molten mass. This method also has proved to be a difficult undertaking as the slag formation on the surface of the bath prevents an intimate contact of the oxygen and the molten metal. If jets are used of sufficient velocity to pierce the layer of slag floating on the metal surface, the resultant contact of oxygen and metal is so localized, and their reactions so concentrated, that the amount of iron oxidation becomes unduly large and undesirable quantities of dust laden fumes are generated because of this high concentration. Even when the oxygen jet was directed obliquely to the surface of the bath, it proved difficult to free the surface of the metal, as the motion of the layer of slag is such that it is continuously converging upon the cleared area.

Various means have been devised to overcome the aforesaid difficulties, including oscillating lances and lances equipped with rotating jets. Such machines, subjected to the extreme temperatures of iron refining processes, have rather short operating lives, however.

This invention has for its principal object the provision of a device adapted to simultaneously displace the slag from the area of oxygen contact, and to bring about the contact of the oxygen and metal at the cleared area.

Another object of the invention is the provision of a device as described which is not dependent upon excessive oxidizing gas velocities for effective results.

Another object of this invention is to provide a process for refining steel wherein the slag layer on the molten metal is displaced to enable the oxidizing gas to be blown directly on the cleared metal surface.

A still further object of the invention is the provision of a device whereby the results are attained without the use of moving parts.

Other objects and advantages of the invention will become apparent during the course of the following description and appended claims, taken in connection with the accompanying drawing forming a part hereof.

In the drawing:

Figure 1 is a vertical transverse section of an improved oxygen lance, as taken on line 1—1 of Figure 2. The omitted center portion being structurally identical with the immediate adjacent portions of the ends as illustrated.

Figure 2 is a plan view of the device as viewed from line 2—2 of Figure 1.

Figure 3 is a typical horizontal transverse section taken on line 3—3 of Figure 1.

Figure 4 is a diagrammatic outline generally illustrating the relative locations and proportions of a vessel with a lance inserted in the operating position.

Figure 5 is an elevation of the lower end of the lance illustrating the operation of the slag displacing means and the introduction of the oxygen to the exposed molten metal surface.

Referring to the drawing in detail:

An oxygen lance 10 comprises an inner centrally located tubular member 11 of relatively small diameter as compared to its length, having a plurality of concentrically disposed outer enclosing members of annular horizontal transverse section as will be further described. The tubular member 11 at its lower extremity is fitted with a nozzle 12 having a central aperture therein forming an outlet for the member 11. The aperture, which is restricted in area relative to the bore of the member 11, has walls diverging in the direction of flow having a bore of progressively increasing cross-sectional area toward its discharge end. This construction is adapted to cause a spreading of the oxidizing medium as indicated by the letter O in Figure 5. A heat resisting alloy will be used in the manufacture of the nozzle 12 which is preferebly made detachable in order that its replacement will be readily facilitated.

At its upper end the tubular member or oxygen pipe 11, which at this point extends beyond the main body of the lance 10, is equipped with a fitting 13 by means of which connection is made to a source of oxygen supply. All fluid connections to the lance will of course be of a flexible type in order that the free up-and-down motion of the device will not be retarded or obstructed.

A second tubular member 14 encloses the inner central member 11 in concentric relationship, being generally flush with 11 at the lower end of the lance, and extending to a point closely adjacent the fitting 13 at the upper end. The tubular members 11 and 14 are maintained in coaxial relationship by means of mating flanges 15 and 16 forming a part of the members 11 and 14 respectively. Ribs or spacers 17 extend across the space 18 bounded on the inside by the outer wall of the member 11 and on the outside by the inner wall of the member 14. This space forms a passageway of annular cross-section, and is intended to convey the slag displacing medium which enters the passage through a fitting 19 located adjacent the flange 16. The ribs 17 may be spaced at intervals along the passageway 18 as found necessary, but should be so arranged and proportioned as to form a minimum of obstruction to the flow of gas within this space.

At the lower end of the member 14 the inside wall is flared as indicated at 20 on Figure 1, and the outer wall of the nozzle 12 is formed complementary to this flared portion, causing the slag displacing gases G to issue in such a manner and being so directed as to effectively clear an area on the surface, which is advantageously predetermined, of the bath as delineated on Figure 5, thereby enabling the oxygen to impinge directly upon the cleared metal surface.

Surrounding the member 14, for the major portion of its length, is a heat insulating covering 21 which in turn is enclosed and held in place by a third tubular member 22 attached to the member 14 adjacent the upper end thereof by a second pair of mating flanges 23 and 24 respectively. At its lower end the member 22 is formed with converging walls 23 which terminate in contiguous relationship with the outer wall of the member 14 and form a tight seal at this juncture. A relatively short portion of the lower end of the member 14 is left uninsulated for reasons which will be apparent as the description continues.

The inner structure, as described so far, comprises the oxygen and slag displacing gas-directing means, the remaining or outer portion of the lance being adapted to protect the structure from the effect of the extreme temperatures to which it is subjected in service. This outer portion consists of an exterior shell or casing 25 having an inner baffle 26 coaxial therewith. The baffle 26, which is of tubular form, is secured to the upper end of the member 22 by means of flanges 27 and 28. At the lower end it is held in place in concentric relationship to the member 22 by means of ribs 29. This baffle enables cooling water to be introduced into the upper end of the lance by means of a fitting 30 located as shown and also permits the discharge of the water at the upper end through a similar fitting 31 communicating with the interior of the casing 25.

Water entering the space 32 through the fitting 30 flows in a downward direction, traveling almost the entire length of the device, due to the depth of the baffle 26 within the casing 25. It then reverses flow traveling upwardly in the annular passageway 33 and is discharged through the fitting 31. The flow, of course, can be in the reverse direction if such is found to be more expedient.

Attachment of the outer casing 25 to the baffle 26 at the upper ends thereof is made by an inwardly extending flange 34 which effectively seals the upper end of the passageway 33. At the lower end, the casing 25 slopes inwardly generally parallel with the end 23 of the member 22 and is attached to the lower end of the tubular member 14 in similar fashion to the adjacent juncture of 23 and 14. This joint also forms an effective seal adapted to restrict the flow of the cooling water circulating through the device.

With reference to Figure 4 it will be noted that the exterior surface, and also the lower end of the lance is subjected to the extreme temperature of the heat generated in the blowing process. It is the purpose of the cooling water to dissipate heat transferred to the device and counteract the detrimental effect imposed thereby. For this reason, the lower end of the member 14 is left uninsulated for a portion of its length sufficient to provide adequate cooling for the area adjacent the nozzle 12. It is also to be noted, ribs or spacers 17, shown in Figures 1 and 3 as joining tubular members 11 and 14 in the vicinities of their discharge ends, enhance the heat abstraction from nozzle 12 by effecting a heat conducting relationship between the portion of tubular member 14 near the discharge end thereof and the nozzle 12.

The insulating jacket 21 serves a twofold purpose: if steam is used as the slag displacing medium, the insulating jacket will preclude the possibility of the cooling water having a chilling effect upon the steam and causing condensation; and, by preventing heat transfer from the center of the lance outward, it contributes to a more effective cooling of the lance exterior.

In operation, the device is inserted into the vessel V, being located with reference thereto as indicated on Figure 4. The slag displacing medium which can be steam, carbon dioxide or an inert gaseous substance, is then forced through the device with sufficient pressure to displace the slag 5 and expose the surface of the hot metal M, immediately below the lance, and prepare it for impingement by the oxygen jet from the central pipe 11 through the nozzle 12. As the pressure of the oxygen blast is no longer required to pierce the layer of slag on the surface of the metal, such pressure is advantageously regulated for maximum efficiency of its primary, and now sole function, namely, the refining of the steel. Pressure of the slag displacing medium can also be regulated to furnish sufficient kinetic energy to the issuing gas to effectively clear the surface of the metal as has been diagrammatically indicated on Figure 5.

During the blowing period, the cooling water is circulated through the device as has been explained heretofore.

It is a particular advantage of the device of this invention that it enables introduction into the vessel or converter of slag displacing gas at lower temperature, for instance, steam, especially steam at lower temperature. Such introduction reduces the temperatures in the upper portion of the vessel, above the molten metal, and thereby the life of the refractory linings of the vessel and also of the gas take-off duct are considerably increased. The presence of steam would have also the advantage of arresting any undesirable reactions between the carbon monoxide-rich gases and the iron oxide dust.

It is a further advantage of this device that it enables blowing with oxygen at lower velocities, thereby avoiding local overconcentration of oxygen and excessive local heating and, as a consequence, the production of oxidized iron particles, or iron oxide, is reduced. In the usual oxygen-blowing process, large quantities of iron oxide dust are produced and this dust is noted coming off with the gases as a dark brownish-red smoke. The present lance provides a means of notably reducing the production of such smokes. The device enables introduction of the slag displacing gas at high velocities to effect the physical work of clearing off the metal surface and exposing the molten metal with its contained or dissolved impurities, and simultaneous independent introduction of a stream of oxygen in substantially the amounts theoretically required to react with the impurities to be removed by oxidation and at reduced or moderate velocities. As stated, this enables reduction of iron loss, as oxide, and reduction in the dust load of the gases issuing from the converter with consequent reduction in the dust recovery problems.

From the foregoing it will be apparent that the present invention provides a device adapted to effectively overcome the difficulties and disadvantages now extant in present practice, and it should be understood that while there is above disclosed a preferred embodiment of my device, modifications may be made within the spirit and scope of the appended claims.

I claim:

1. A process for refining steel wherein an oxidizing gas is blown upon the surface of a molten mass consisting of molten metal covered by a slag layer, the improvement which comprises surrounding said oxidizing gas with a slag displacing gas selected from the group consisting of steam, carbon dioxide, and an inert gas which impinges on said slag layer in such manner as to displace a portion of said slag layer thereby enabling the oxidizing gas to be blown directly upon the cleared metal surface.

2. A process according to claim 1 wherein the slag displacing gas surrounding the oxidizing gas diverges in the direction of flow of said slag displacing gas.

3. A process according to claim 1 wherein the oxidizing gas and the slag displacing gas diverge in the direction of flow of the said gases.

4. A process according to claim 1 wherein the slag displacing gas is steam.

5. An oxygen lance comprising a plurality of concentric tubular members which includes: an inner tubular member having inlet and discharge ends, said discharge end having a nozzle with an aperture of radially diverging walls and of restricted area relative to the bore of said inner tubular member, a second surrounding tubular member with inlet and discharge ends and spaced apart from and forming an annular passageway with the outer wall of said inner tubular member, the discharge end of said second tubular member being flared and in coplanar relationship with the discharge end of said inner tubular member, an insulating jacket surrounding said second tubular member for a major portion of its length, a portion of said second tubular member near the discharge end thereof being uninsulated and connected to said inner tubular member by spacer members thereby effecting a heat conducting relationship between the uninsulated portion of said second tubular member and said nozzle of said inner tubular member, a third surrounding tubular member totally enclosing said insulating jacket, an outer casing enclosing all of said tubular members and being adapted to contain a cooling fluid surrounding said third tubular member and said uninsulated portion of said second tubular member, and a tubular baffle member within said casing being positioned intermediate said third tubular member and said outer casing and being adapted to direct the flow of cooling fluid longitudinally through said lance and reverse the flow at one end thereof.

6. A process for refining steel wherein an oxidizing gas is blown upon the surface of a molten mass consisting of molten metal covered by a slag layer, the improvement which comprises establishing and maintaining a divergent annular stream of slag displacing gas selected from the group consisting of steam, carbon dioxide, and an inert gas which impinges on the surface of said molten mass thereby clearing the slag layer from a portion of the said molten mass surface, and passing a divergent stream of oxidizing gas through the inner area bounded by said divergent annular stream of slag displacing gas, thereby blowing the oxidizing gas directly upon the cleared molten metal surface.

7. The process of claim 6 wherein the slag displacing gas is steam.

References Cited in the file of this patent

UNITED STATES PATENTS

| | | |
|---|---|---|
| 730,142 | Messhon | June 2, 1903 |
| 1,192,573 | Schneider | July 25, 1916 |
| 1,229,938 | Golden | June 12, 1917 |
| 1,689,551 | Hammond | Oct. 30, 1928 |
| 1,793,849 | Groninger | Feb. 24, 1931 |
| 1,856,678 | Williams | May 3, 1932 |
| 1,968,917 | Soldatoff | Aug. 7, 1934 |
| 2,207,655 | Cain | July 9, 1940 |
| 2,333,654 | Lellep | Nov. 9, 1943 |
| 2,446,511 | Kerry et al. | Aug. 3, 1948 |
| 2,515,631 | Chiswik | July 18, 1950 |
| 2,546,937 | Wyandt et al. | Mar. 27, 1951 |

FOREIGN PATENTS

| | | |
|---|---|---|
| 235,316 | Great Britain | June 15, 1925 |
| 710,852 | Germany | Aug. 14, 1941 |
| 969,303 | France | Dec. 19, 1950 |